United States Patent
Liu et al.

(10) Patent No.: US 8,116,248 B2
(45) Date of Patent: Feb. 14, 2012

(54) APPARATUS AND METHOD FOR POWER-SAVING IN MULTIPLE ANTENNA COMMUNICATION SYSTEM

(75) Inventors: Der-Zheng Liu, Hsinchu County (TW); Chung-Yao Chang, Hsinchu County (TW); Kuang-Yu Yen, Hsinchu County (TW)

(73) Assignee: Realtek Semiconductor Corp., Hsinchu (TW)

( * ) Notice: Subject to any disclaimer, the term of this patent is extended or adjusted under 35 U.S.C. 154(b) by 393 days.

(21) Appl. No.: 12/544,769

(22) Filed: Aug. 20, 2009

(65) Prior Publication Data
US 2010/0046408 A1  Feb. 25, 2010

(30) Foreign Application Priority Data
Aug. 22, 2008 (TW) .............................. 97132166 A

(51) Int. Cl.
*G08C 17/00* (2006.01)

(52) U.S. Cl. ...................... 370/311; 370/334; 455/343.2
(58) Field of Classification Search ....................... None
See application file for complete search history.

(56) References Cited

U.S. PATENT DOCUMENTS
2007/0002878 A1* 1/2007 Moorti et al. ................. 370/401
2007/0286066 A1* 12/2007 Zhang et al. .................. 370/208
* cited by examiner

*Primary Examiner* — Jianye Wu
(74) *Attorney, Agent, or Firm* — Thomas, Kayden, Horstemeyer & Risley, LLP

(57) ABSTRACT

A multiple-antenna transceiver in the present invention includes a frame controller and circuitry for transmitting and receiving. The transmitting component includes a sequence selection circuit, a MIMO modulation and coding circuit, and numerous TX RFE and AFE circuits. The receiving component includes a MIMO demodulation and decoding circuit, a sequence separation circuit, and numerous RX RFE and AFE circuits. The frame controller can enable and disable the TX and RX RFE and AFE circuits individually so as to reduce power consumption of the whole system.

19 Claims, 12 Drawing Sheets

APPARATUS AND METHOD FOR POWER-SAVING IN MULTIPLE ANTENNA COMMUNICATION SYSTEM

CROSS-REFERENCE TO RELATED APPLICATION

This application claims priority of Taiwanese application no. 097132166, filed on Aug. 22, 2008.

BACKGROUND OF THE INVENTION

1. Field of the Invention

This invention relates to a communication system, more particularly to a MIMO (multiple input multiple output) wireless communication system.

2. Description of the Related Art

The technology of MIMO has been applied to a variety of wireless communication systems recently, including the WLAN (wireless local area network), the WiMAX (Worldwide Interoperability for Microwave Access) and the 4G (4$^{th}$ generation) mobile phone system. These systems have adopted the MIMO to increase transmission speed or channel capacity.

Inevitably, additional antennas and RFE (radio frequency front-end) and AFE (analog front-end) circuits are necessary at the transmitting and receiving ends of the corresponding transmission routes of a MIMO. The hardship of the current application with MIMO is however, to reduce power consumption of the additional components that appears in the corresponding transmission routes.

The general format of each data frame or packet utilized in a wireless system is illustrated in FIG. 1. The format usually includes a preamble sequence used for frame or packet detection, AGC (automatic gain control), carrier synchronization, and timing synchronization. Certain systems even have pilot sequences that are placed within the preamble sequence or in between data sequences for adaptive tracking in channel estimation or equalization, and for timing and frequency tracking.

An additional header sequence is usually required in front of the data sequence in cases when the modulation scheme, coding rate, or number of spatial streams is modified for different demands of channel quality and throughput so that the receiver can demodulate and decode the subsequent data sequences correctly. The header sequence is generally encoded with the modulation scheme and coding rate having the lowest level SNR (signal-to-noise ratio) requirements. Hence, the header sequence will be more immune to poor channel responses.

FIG. 2 depicts the conventional multiple-antenna transmitter in block diagram. As illustrated, a multiple-antenna transmitter 200 includes a TX (transmit) frame controller 210, a sequence selection circuit 212, a MIMO modulation and coding circuit 214, and a number of M TX RFE and AFE circuits 216_1~216_M. When the transmitter transmits a data frame or packet, the TX frame controller 210 sends the preamble sequence, the header sequence, and data sequence consecutively to the MIMO modulation and coding circuit 214 via the sequence selection circuit 212 during a certain period of time. The MIMO modulation and coding circuit 214 modulates and encodes the sequences according to a specific modulation scheme, coding rate, and number of spatial stream and then transmits the signals of each transmitting route from the M antennas through the TX RFE and AFE circuits 216_1~216_M, wherein M is an integer greater or equal to 1.

In order to increase transmission speed or channel capacity in different requirements of channel quality and throughput, the data sequences are modulated and encoded according to various modulation schemes, coding rates, or number of spatial streams such that the signals transmitting via the transmission routes need not be the same. Parameters of the data sequences are placed in the contents of the header sequence to inform the receiver about relevant information for demodulation and decoding. The header sequence is modulated and encoded according to the lowest level SNR requirements.

FIG. 3 depicts the conventional multiple-antenna receiver in block diagram. As illustrated, a multiple-antenna receiver 300 includes a RX (receive) frame controller 310, a MIMO demodulation and decoding circuit 312, a sequence separation circuit 314, and a number of N RX RFE and AFE circuits 216_1~216_N, wherein N is an integer greater or equal to 1. The receiver collects signals from N receiving routes that corresponds to N antennas and N RX RFE and AFE circuits 216_1~216_N. A preamble sequence received is processed for frame or packet detection to track the arrival of a data frame or packet. Processes including the AGC, carrier synchronization, timing synchronization, and frame synchronization are then handled when the data frame or packet is detected. The timing of the subsequent sequences is generally confirmed after the frame synchronization process. The RX frame controller 310 demodulates and decodes the header sequence during a corresponding time interval and applies MIMO demodulation and decoding using the lowest level SNR requirements. Information extracted from the header sequence during the time interval determines the schemes for further MIMO demodulation and decoding processes applied to subsequent data sequences.

Increased power consumption may be a problem in multiple-antenna systems because of the multiple transmission routes. Nonetheless, the actual power consumption ($P_{RX}$) should be calculated by averaging the transmit power consumption ($P_{TX}$), the receive power consumption ($P_{RX}$), the idle power consumption ($P_{RX\_Idle}$), and the sleep power consumption ($P_{Sleep}$) by weighting them with their respective operating time. The formula of the weighted average is set forth as follows:

$$P_{Avg} = \frac{P_{TX} \cdot T_{TX} + P_{RX} \cdot T_{RX} + P_{RX\_Idle} \cdot T_{RX\_Idle} + P_{Sleep} \cdot T_{Sleep}}{T_{TX} + T_{RX} + T_{RX\_Idle} + T_{Sleep}}$$

Hence, important issues have been raised on topics regarding efficient ways to cut down transmit power consumption, receive power consumption, idle power consumption, and sleep power consumption when the time interval for each operation is preset.

It should be noted that the idle time of a system is generally much longer than the time intended for transmitting and receiving data. In order to reduce overall power consumption, the typical approach is to lengthen the sleep time, which is relatively less power consuming compared to that during idle time and also to reduce sleep power consumption to a greater extent. However, the time for the system to stay in the sleep mode is still being limited because there is a possibility that packets may be lost during the state of system sleep. There is a conventional approach that reduces average power consumption by allowing only one antenna to transmit and receive during most of the time and turning on the multiple antennas to transmit and receive data when higher transmission rates are required by the system.

As a result, power conservation in multiple-antenna systems has been raised as an important issue yet to be solved.

SUMMARY OF THE INVENTION

Therefore, one of the objects of the present invention is to provide a multiple-antenna transceiver that can overcome the aforesaid drawbacks of the prior art.

According to the present invention, a multiple-antenna transmitter comprises a sequence selection circuit, a MIMO modulation and coding circuit, numerous TX RFE and AFE circuits, and a controller. The sequence selection circuit selects among preamble, header, and data sequences to output one of them at a time successively. The MIMO modulation and coding circuit modulates and encodes the sequences from the output of the sequence selection circuit to generate a modulation and coding signal. The TX RFE and AFE circuits are coupled to the MIMO modulation and coding circuit for transmitting the modulation and coding signal. The controller enables and disables each TX RFE and AFE circuit individually.

According to the present invention in another aspect, a multiple-antenna receiver comprises numerous RX RFE and AFE circuits, a MIMO demodulation and decoding circuit, a sequence separation circuit, and a controller. The RX RFE and AFE circuits generate a corresponding number of radio frequency receiving signals from the radio frequency signals received from antennas. The MIMO demodulation and decoding circuit is coupled to the RX RFE and AFE circuits for demodulation and decoding the radio frequency receiving signals to generate a demodulation and decoding signal. The sequence separation circuit is coupled to the MIMO demodulation and decoding circuit for separating the demodulation and decoding signal to generate a header sequence and a data sequence of a data frame. The controller enables and disables each RX RFE and AFE circuit individually.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
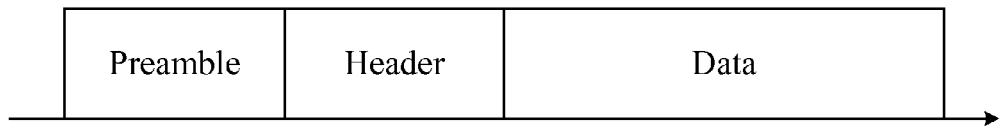
FIG. 1 is a plot illustrating the format of a typical data frame utilized in a wireless communication system.
Figure 2:
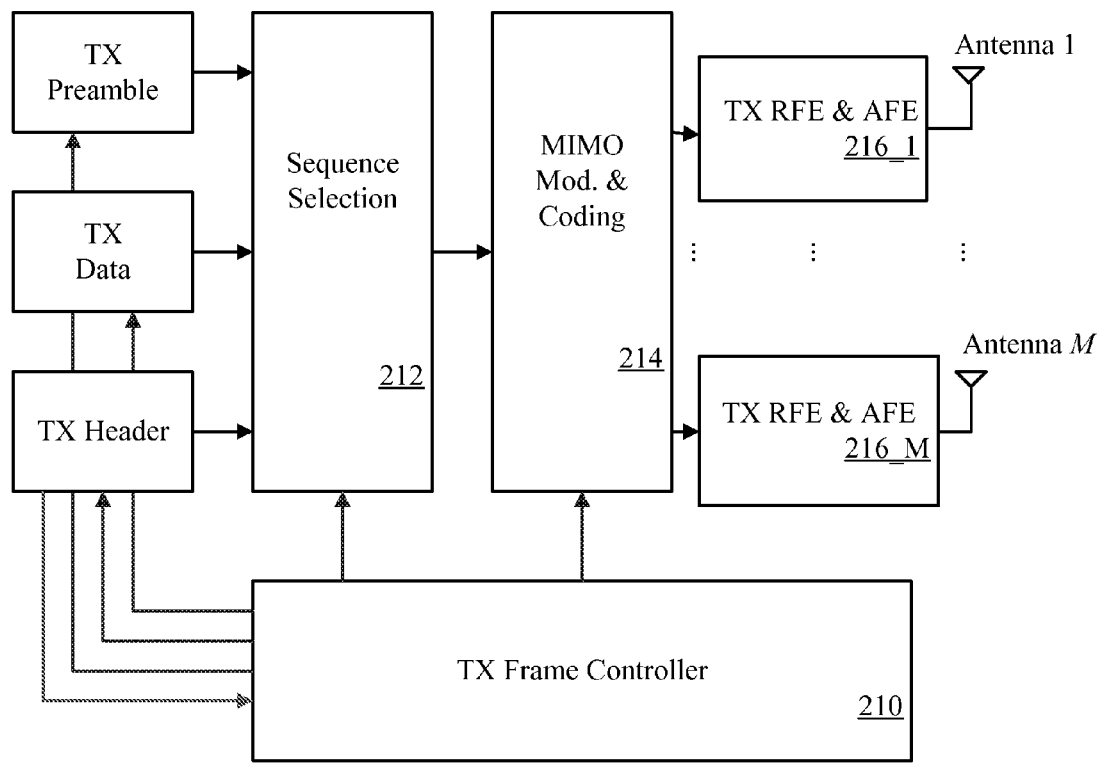
FIG. 2 illustrates a conventional multiple-antenna transmitter in block diagram.
Figure 3:
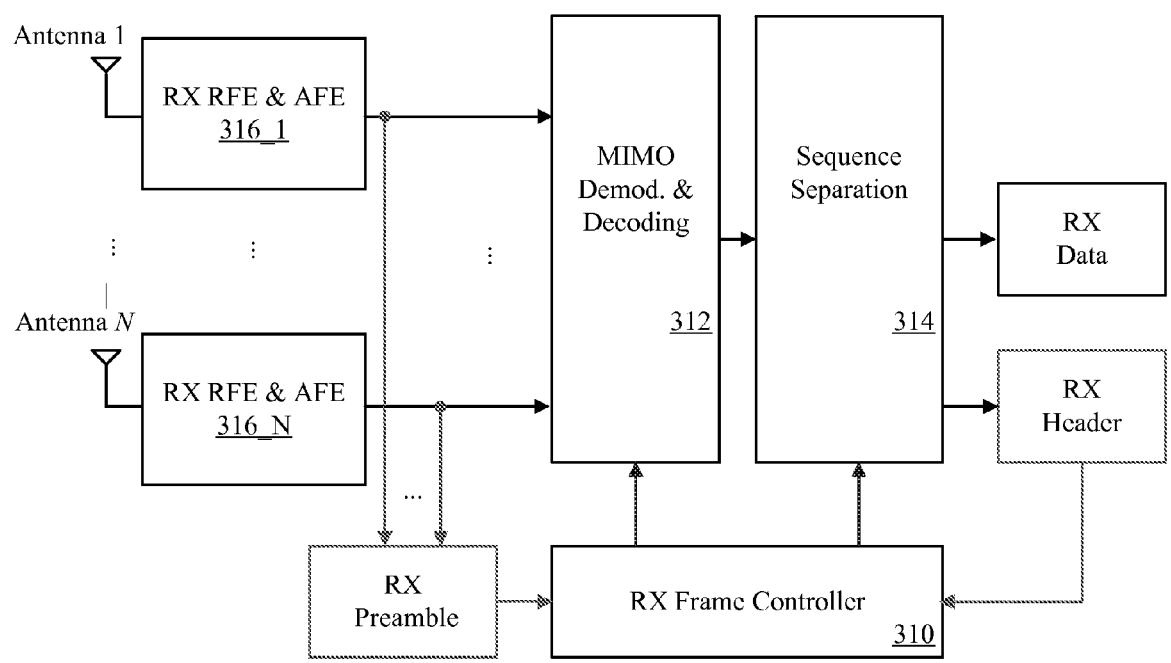
FIG. 3 illustrates a conventional multiple-antenna receiver in block diagram.

Before the present invention is described in greater detail, it should be noted that like elements are denoted by the same reference numerals throughout the disclosure.

The present invention applies to multiple-antenna transceiving modes to reduce average power consumption of the wireless communication system. Since a system receiver cannot be sure of packet arrival time, the receiver stays in packet detection state during a system idle state. There is a substantial difference in terms of power consumption between conditions when all RX RFE and AFE circuits of the receiving routes are turned on and when only certain RX RFE and AFE circuits are turned on during packet detection state.

Hence, the present invention categorizes the system operation states into various modes, details are as set forth below:

(1) Idle mode: only certain RX RFE and AFE circuits of the receiving routes are turned on in this mode.

(2) Transmit mode: only certain TX RFE and AFE circuits of the transmitting routes are turned on in this mode.

(3) Receive mode: all RX RFE and AFE circuits of the receiving routes are turned on in this mode. It should be noted that in some cases only certain RX RFE and AFE circuits of the receiving routes are turned on in order to meet the minimum requirement for the number of receiving routes, the RX RFE and AFE circuits of the rest of the receiving routes are thereby in the off state.

(4) Sleep mode: all RX RFE and AFE circuits of the receiving routes and all TX RFE and AFE circuits of the transmitting routes are turned off.

Figure 4:
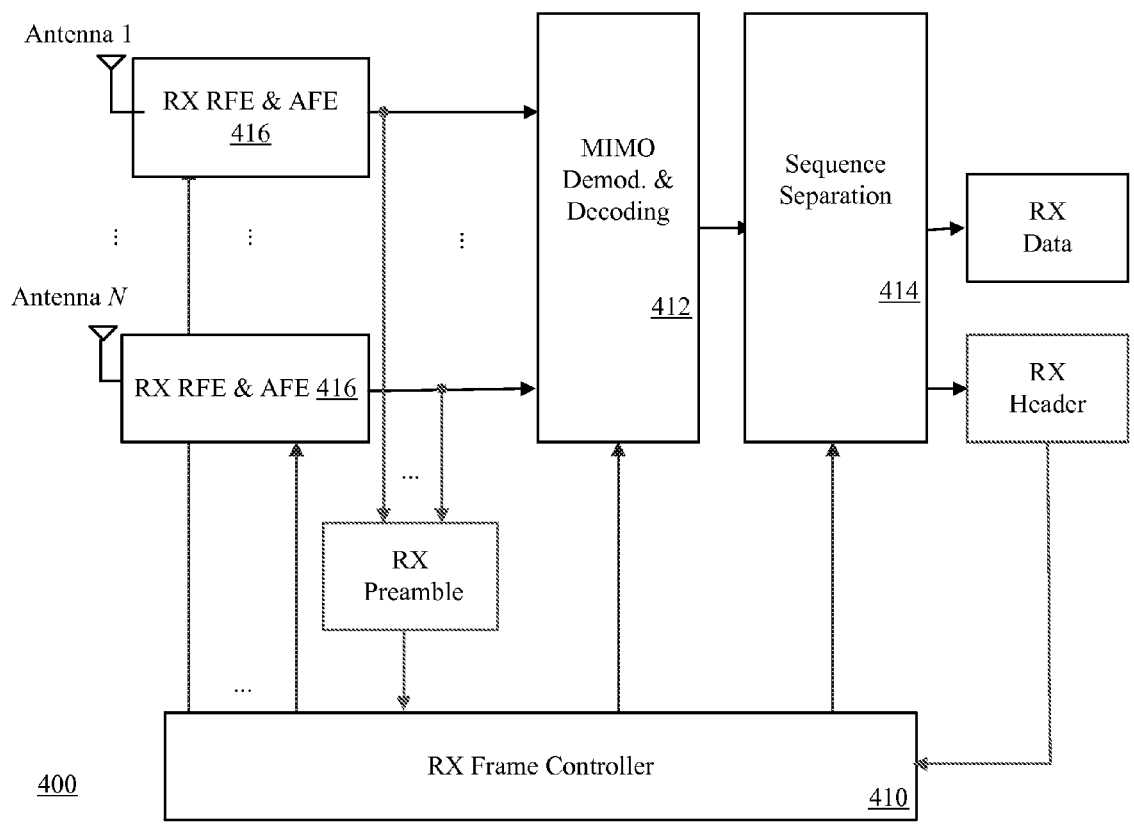
FIG. 4 illustrates a preferred embodiment of a multiple-antenna receiver built according to the present invention in block diagram.

Referring to FIG. 4, the preferred embodiment of a multiple-antenna receiver 400 in the present invention includes a RX frame controller 410, a MIMO demodulation and decoding circuit 412, a sequence separation circuit 414, and a number of N RX RFE and AFE circuits 416. The RX frame controller 410 in this embodiment can enable and disable the N RX RFE and AFE circuits 416 individually so as to reduce power consumption of the system. Specific descriptions of the functions and system architecture of other parts in the circuitry are well recognized by those of ordinary skill in the art and are thus omitted herein for brevity.

Figure 5:
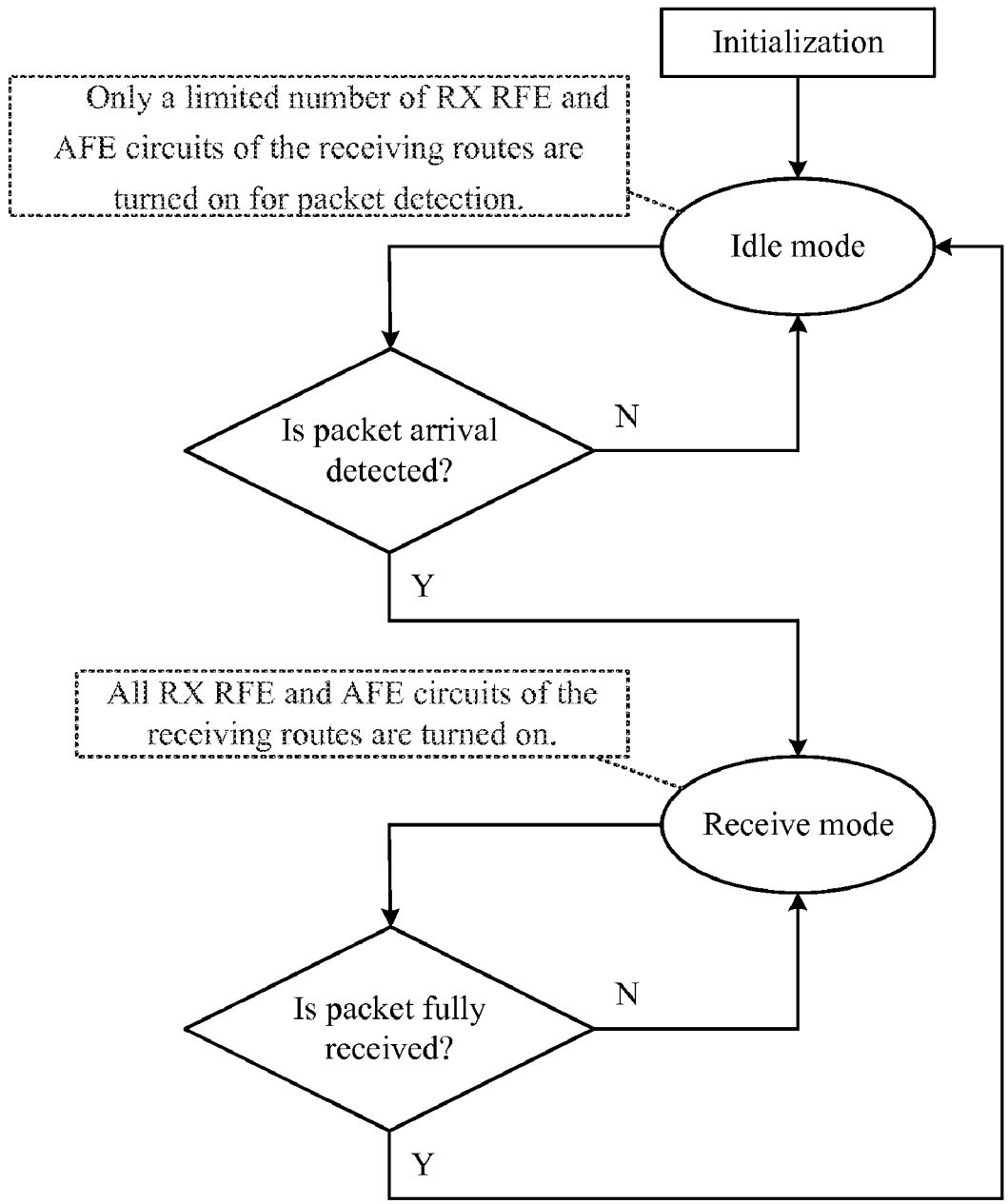
FIG. 5 illustrates a flow chart of the first method that applies to the preferred embodiment of the present invention.

In keeping with the features of the present invention, the first method that applies to the preferred embodiment of a multiple-antenna receiver is depicted in a flow chart in FIG. 5. The steps are summarized as follows:

(1) Entering an idle mode initially:

Only a certain number of RX RFE and AFE circuits of the receiving routes are turned on for packet detection, the RX RFE and AFE circuits of the rest of the receiving routes are turned off.

(2) Entering receive mode when packet arrival is detected:

All RX RFE and AFE circuits of the receiving routes are turned on to receive the packet. When the packet is fully received, the state returns to the idle mode.

There are in some cases of the foregoing steps that certain RX RFE and AFE circuits of the receiving routes are turned on just in order to meet the minimum requirement for the number of receiving routes. The RX RFE and AFE circuits of the rest of the receiving routes are thereby in the off state.

Figure 6:
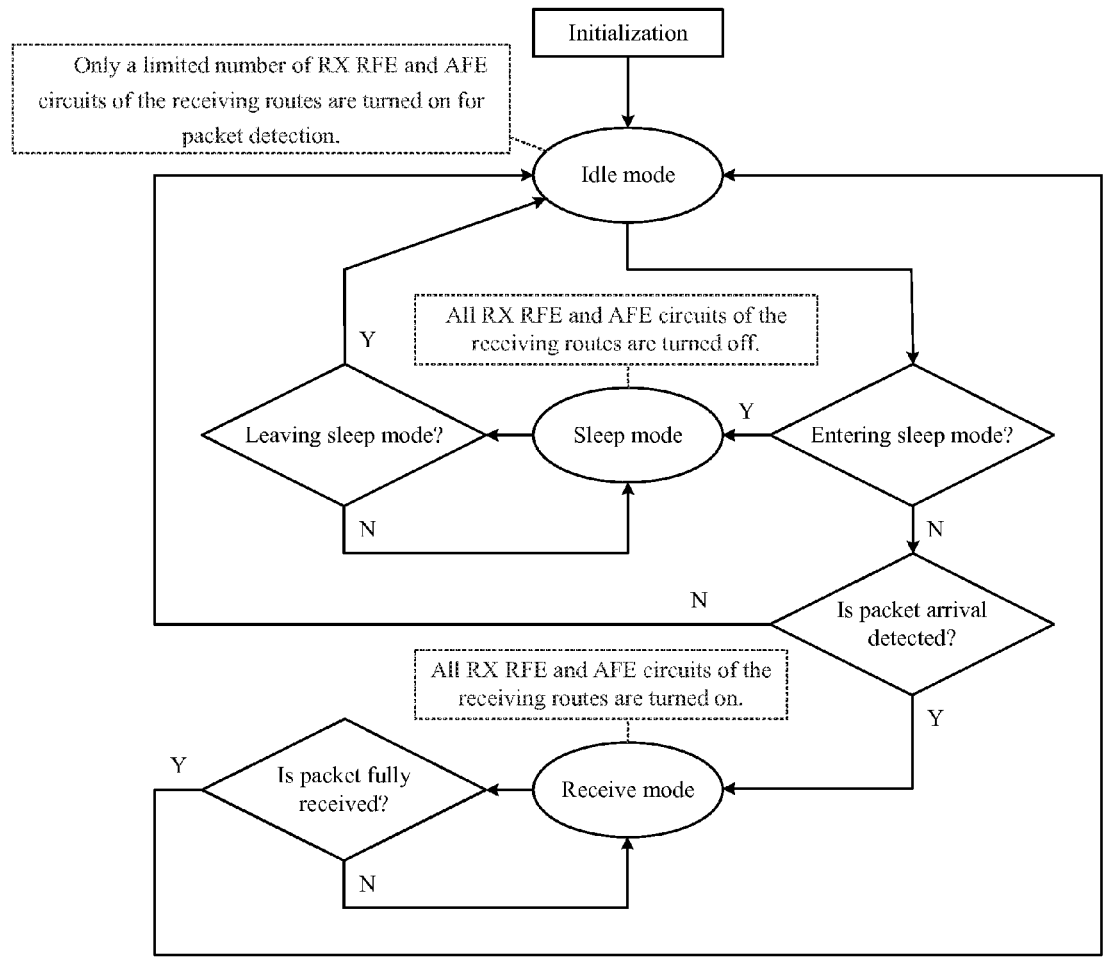
FIG. 6 illustrates a flow chart of the second method that applies to the preferred embodiment of the present invention.

In keeping with the features of the present invention, the second method that applies to the preferred embodiment of a multiple-antenna receiver is depicted in a flow chart in FIG. 6. The steps are summarized as follows:

(1) Entering an idle mode initially:

Only a certain number of RX RFE and AFE circuits of the receiving routes are turned on for packet detection, the RX RFE and AFE circuits of the rest of the receiving routes are turned off.

(2) Entering sleep mode when the sleep mode is activated:

All RX RFE and AFE circuits of the receiving routes are turned off until the idle mode is reentered upon request.

(3) Entering receive mode when packet arrival is detected:

All RX RFE and AFE circuits of the receiving routes are turned on to receive the packet. When the packet is fully received, the state returns to the idle mode.

There are in some cases of the foregoing steps that certain RX RFE and AFE circuits of the receiving routes are turned on just in order to meet the minimum requirement for the number of receiving routes. The RX RFE and AFE circuits of the rest of the receiving routes are thereby in the off state.

Figure 7:
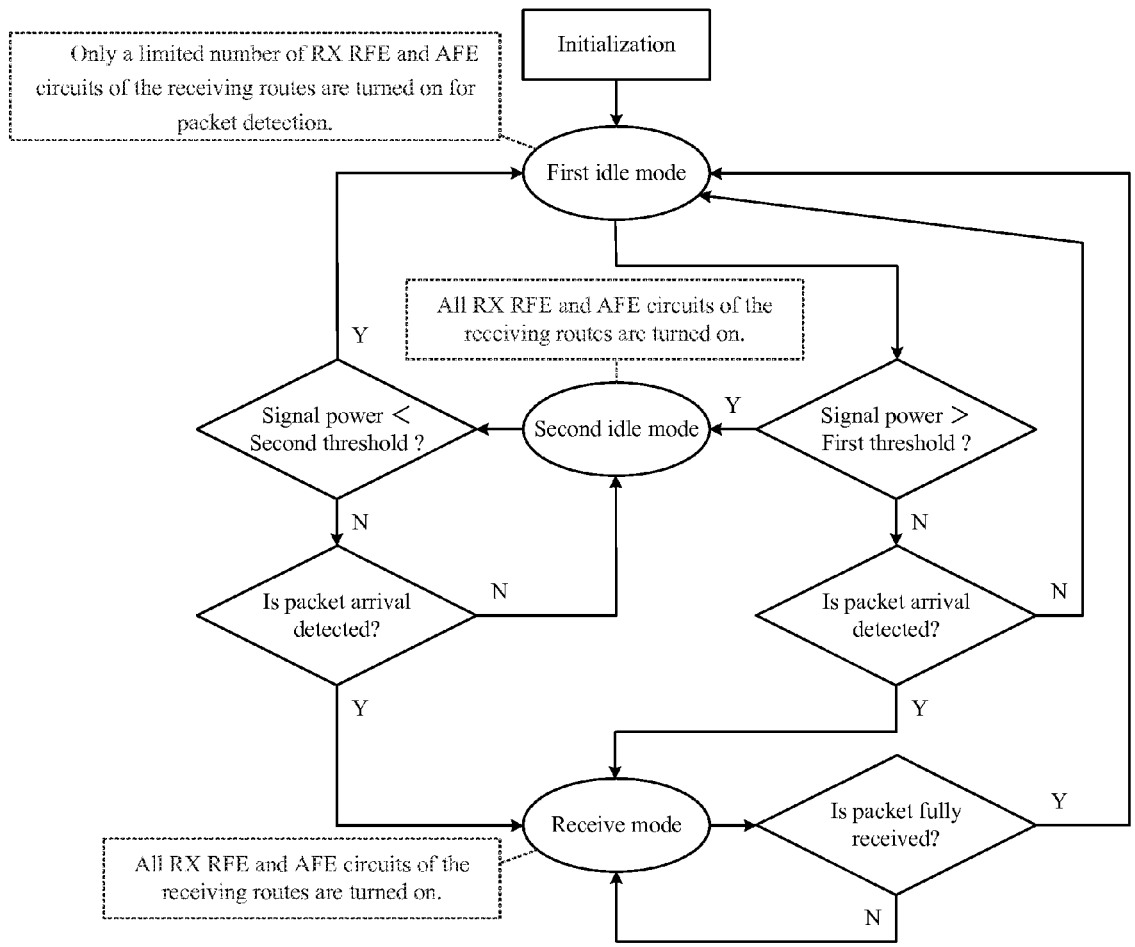
FIG. 7 illustrates a flow chart of the third method that applies to the preferred embodiment of the present invention.

In keeping with the features of the present invention, the third method that applies to the preferred embodiment of a multiple-antenna receiver is depicted in a flow chart in FIG. 7. The steps are summarized as follows:

(1) Entering a first idle mode initially:

Only a certain number of RX RFE and AFE circuits of the receiving routes are turned on for power and packet detection of the incoming signal, the RX RFE and AFE circuits of the rest of the receiving routes are in the off state.

(2) Entering a second idle mode from the first idle mode when the detected signal power exceeds a first threshold in the first idle mode:

The remaining RX RFE and AFE circuits of the receiving routes that were previously in the off state are turned on to continue with signal power and packet detection.

(3) Entering receive mode from the first idle mode when packet arrival is detected in the first idle mode:

All RX RFE and AFE circuits of the receiving routes are turned on to start receiving the packet. When the packet is fully received, the state returns to the first idle mode.

(4) Entering the first idle mode from the second idle mode when the detected signal power is below a second threshold in the second idle mode:

Only a certain number of RX RFE and AFE circuits of the receiving routes are reserved for the ongoing power and packet detection of the incoming signal whereas the RX RFE and AFE circuits of the rest of the receiving routes are in the off state.

(5) Entering receive mode from the second idle mode when packet arrival is detected in the second idle mode:

The packet is being received and when the packet is fully received, the state returns to the first idle mode.

There are in some cases of the foregoing steps that certain RX RFE and AFE circuits of the receiving routes are turned on just in order to meet the minimum requirement for the number of receiving routes. The RX RFE and AFE circuits of the rest of the receiving routes are thereby in the off state.

Figure 8:
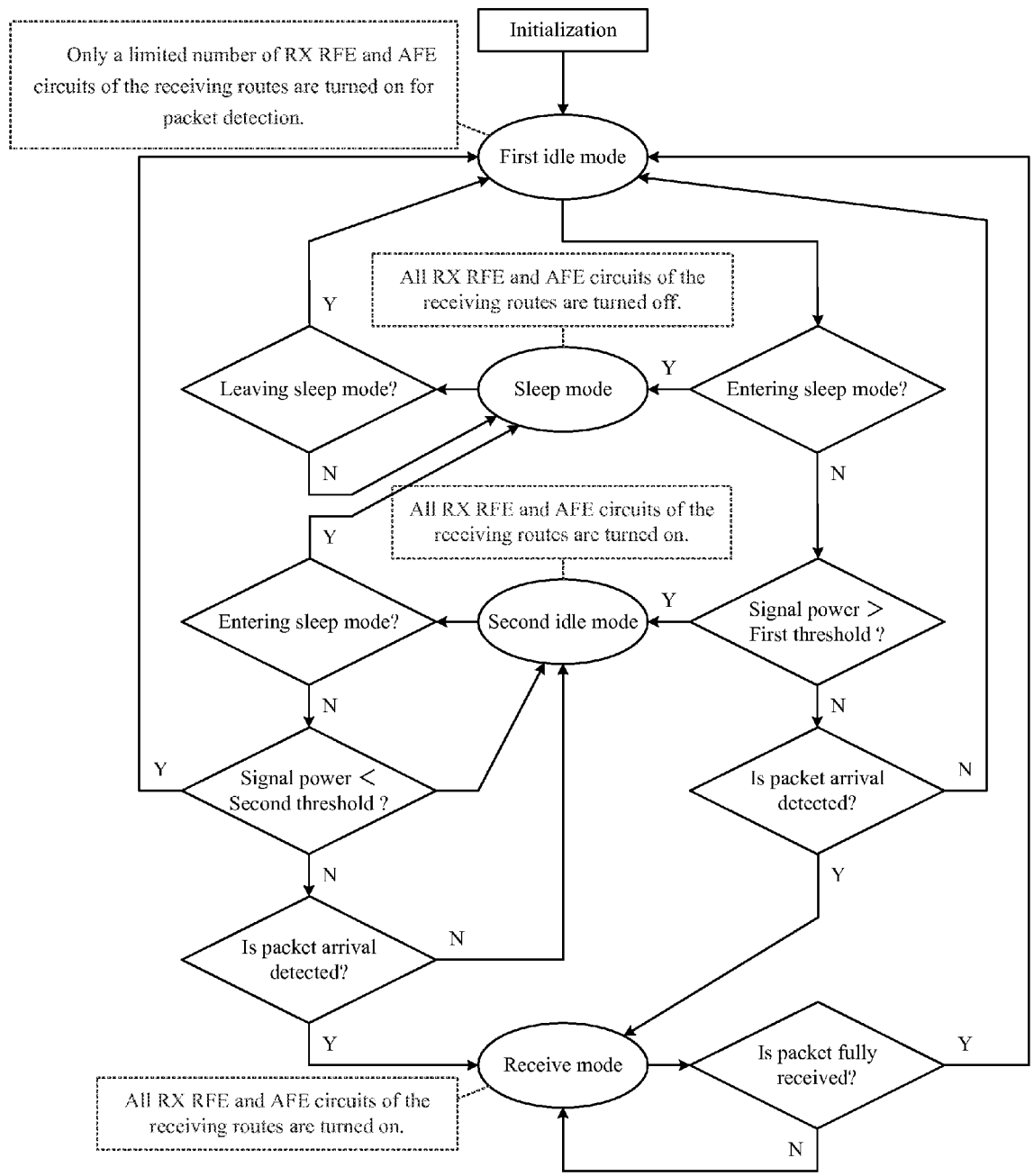
FIG. 8 illustrates a flow chart of the fourth method that applies to the preferred embodiment of the present invention.

In keeping with the features of the present invention, the fourth method that applies to the preferred embodiment of a multiple-antenna receiver is depicted in a flow chart in FIG. 8. The steps are summarized as follows:

(1) Entering a first idle mode initially:

Only a certain number of RX RFE and AFE circuits of the receiving routes are turned on for power and packet detection of the incoming signal, the RX RFE and AFE circuits of the rest of the receiving routes are in the off state.

(2) Entering sleep mode from the first idle mode when the sleep mode is activated in the first idle mode:

All RX RFE and AFE circuits of the receiving routes are turned off until the first idle mode is reentered upon request.

(3) Entering a second idle mode from the first idle mode when the detected signal power exceeds a first threshold in the first idle mode:

All RX RFE and AFE circuits of the receiving routes are turned on to continue with signal power and packet detection.

(4) Entering receive mode from the first idle mode when packet arrival is detected in the first idle mode:

All RX RFE and AFE circuits of the receiving routes are turned on to receive the packet. When the packet is fully received, the state returns to the first idle mode.

(5) Entering sleep mode from the second idle mode in the second idle mode:

All RX RFE and AFE circuits of the receiving routes are turned off until the first idle mode is entered upon request.

(6) Entering the first idle mode from the second idle mode when the detected signal power is below a second threshold in the second idle mode:

Only a certain number of RX RFE and AFE circuits of the receiving routes are reserved for the ongoing power and packet detection of the incoming signal whereas the RX RFE and AFE circuits of the rest of the receiving routes are in the off state.

(7) Entering receive mode from the second idle mode when packet arrival is detected in the second idle mode:

The packet is being received and when the packet is fully received, the state returns to the first idle mode.

There are in some cases of the foregoing steps that certain RX RFE and AFE circuits of the receiving routes are turned on just in order to meet the minimum requirement for the number of receiving routes. The RX RFE and AFE circuits of the rest of the receiving routes are thereby in the off state.

Figure 9:
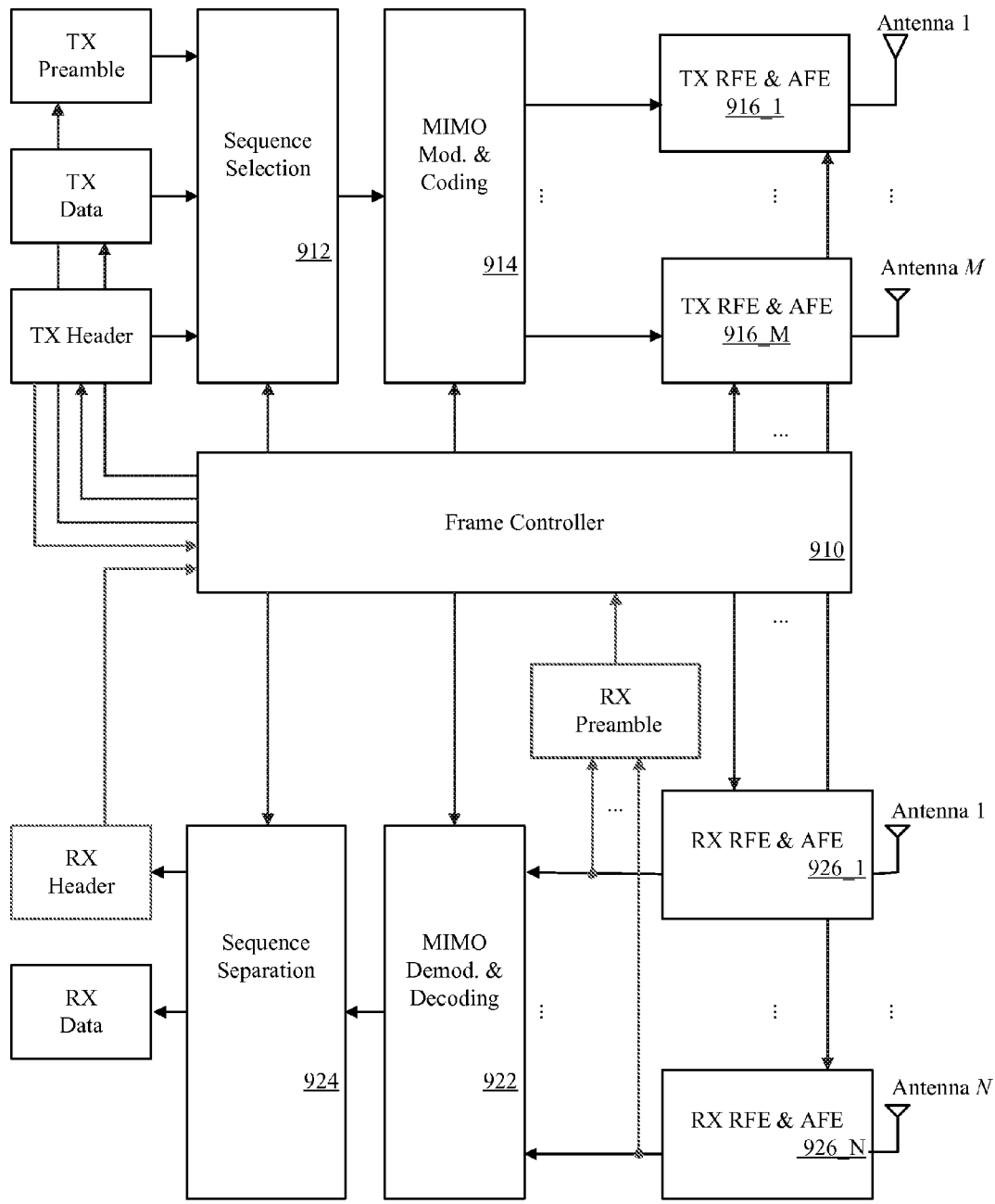
FIG. 9 illustrates a preferred embodiment of a multiple-antenna transceiver built according to the present invention in block diagram.

Referring to FIG. 9, the preferred embodiment of a multiple-antenna transceiver 900 in the present invention includes a frame controller 910 and circuitry for transmitting and receiving. The transmitting component includes a sequence selection circuit 912, a MIMO modulation and coding circuit 914, and a number of M TX RFE and AFE circuits 916_1~916_M. On the other hand, the receiving component includes a MIMO demodulation and decoding circuit 922, a sequence separation circuit 924, and a number of N RX RFE and AFE circuits 926_1~926_N. The frame controller 900 in this embodiment can enable and disable the M TX RFE and AFE circuits 916_1~916_M and the N RX RFE and AFE circuits 926_1~926_N individually so as to reduce power consumption of the whole system. Specific descriptions of the functions and system architecture of other parts in the circuitry are well recognized by those of ordinary skill in the art and are thus omitted herein for brevity.

Figure 10:
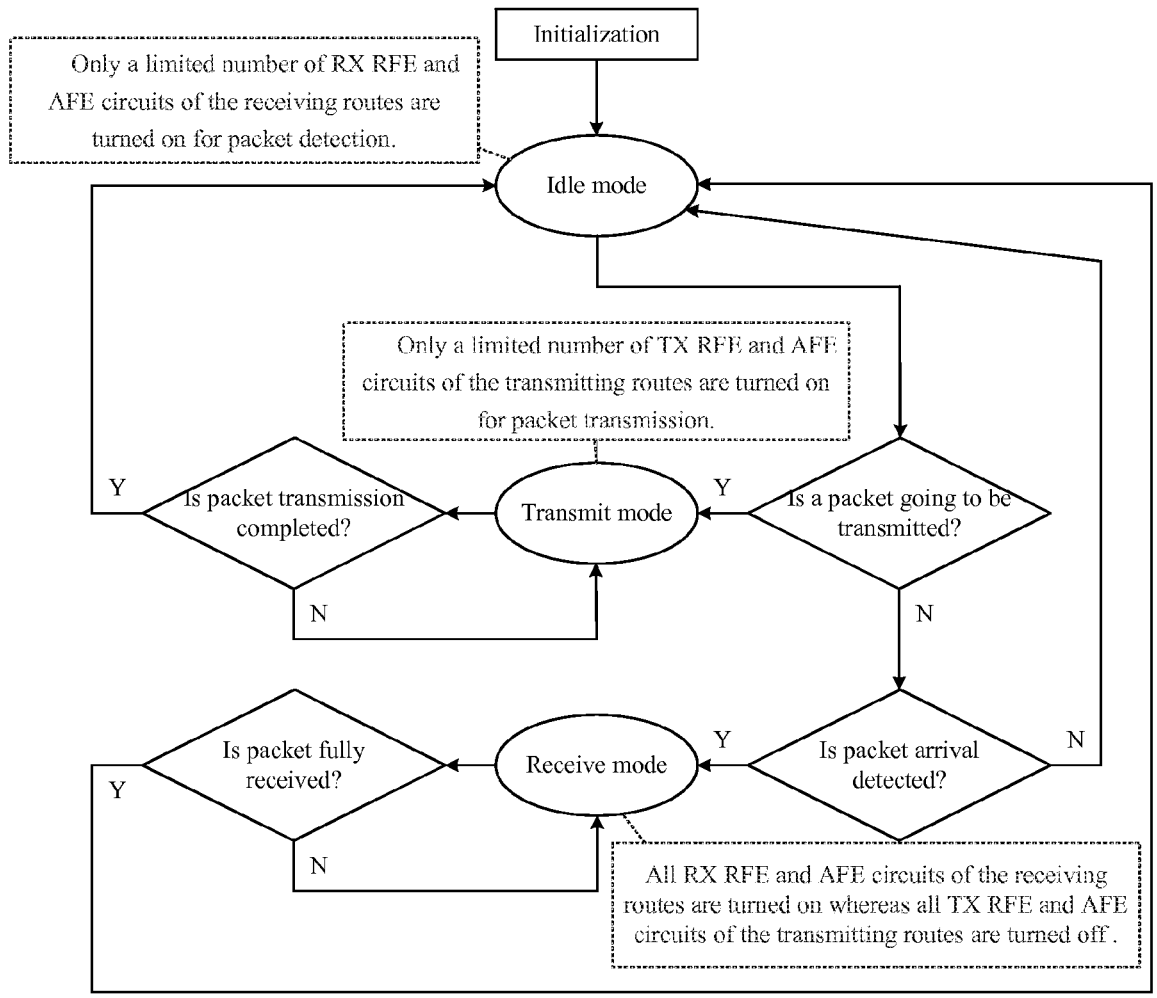
FIG. 10 illustrates a flow chart of the fifth method that applies to the preferred embodiment of the present invention.

In keeping with the features of the present invention, the fifth method that applies to the preferred embodiment of a multiple-antenna transceiver is depicted in a flow chart in FIG. 10. The steps are summarized as follows:

(1) Entering an idle mode initially:

Only a certain number of RX RFE and AFE circuits of the receiving routes are turned on for power and packet detection of the incoming signal, the RX RFE and AFE circuits of the rest of the receiving routes and all TX RFE and AFE circuits of the transmitting routes are turned off accordingly.

(2) Entering transmit mode when a packet is to be transmitted:

Only certain TX RFE and AFE circuits of the transmitting routes are turned on to transmit the packet and the rest of the TX RFE and AFE circuits of the transmitting routes and all RX RFE and AFE circuits of the receiving routes are in the off state. When the packet transmission is completed, the state returns to the first idle mode.

(3) Entering receive mode when packet arrival is detected:

All RX RFE and AFE circuits of the receiving routes are turned on to receive the packet while all TX RFE and AFE circuits of the transmitting routes remain in the off state. When the packet is fully received, the state returns to the first idle mode.

There are in some cases of the foregoing steps that certain RX RFE and AFE circuits of the receiving routes are turned on just in order to meet the minimum requirement for the number of receiving routes. The RX RFE and AFE circuits of the rest of the receiving routes are thereby in the off state.

Figure 11:
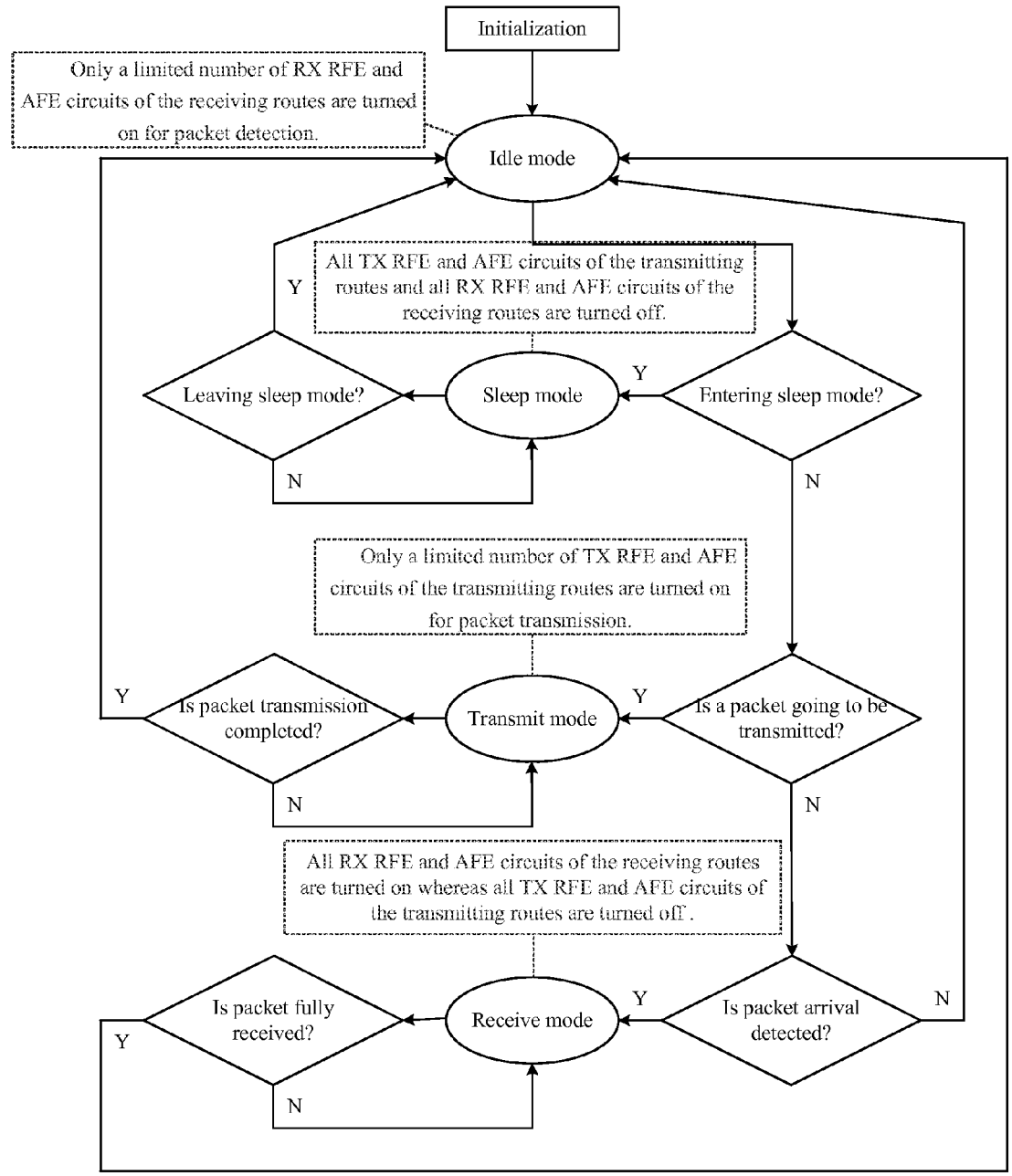
FIG. 11 illustrates a flow chart of the sixth method that applies to the preferred embodiment of the present invention.

In keeping with the features of the present invention, the sixth method that applies to the preferred embodiment of a multiple-antenna transceiver is depicted in a flow chart in FIG. 11. The steps are summarized as follows:

(1) Entering an idle mode initially:

Only a certain number of RX RFE and AFE circuits of the receiving routes are turned on for power and packet detection of the incoming signal, the RX RFE and AFE circuits of the rest of the receiving routes and all TX RFE and AFE circuits of the transmitting routes are turned off accordingly.

(2) Entering sleep mode when the sleep mode is activated:

All RX RFE and AFE circuits of the receiving routes and TX RFE and AFE circuits of the transmitting routes are turned off until the idle mode is reentered upon request.

(3) Entering transmit mode when a packet is to be transmitted:

Only certain TX RFE and AFE circuits of the transmitting routes are turned on to transmit the packet and the rest of the TX RFE and AFE circuits of the transmitting routes and all RX RFE and AFE circuits of the receiving routes are in the off state. When the packet transmission is completed, the state returns to the idle mode.

(4) Entering receive mode when packet arrival is detected:

All RX RFE and AFE circuits of the receiving routes are turned on to receive the packet while all TX RFE and AFE circuits of the transmitting routes remain in the off state. When the packet is fully received, the state returns to the idle mode.

There are in some cases of the foregoing steps that certain RX RFE and AFE circuits of the receiving routes are turned on just in order to meet the minimum requirement for the number of receiving routes. The RX RFE and AFE circuits of the rest of the receiving routes are thereby in the off state.

Figure 12:
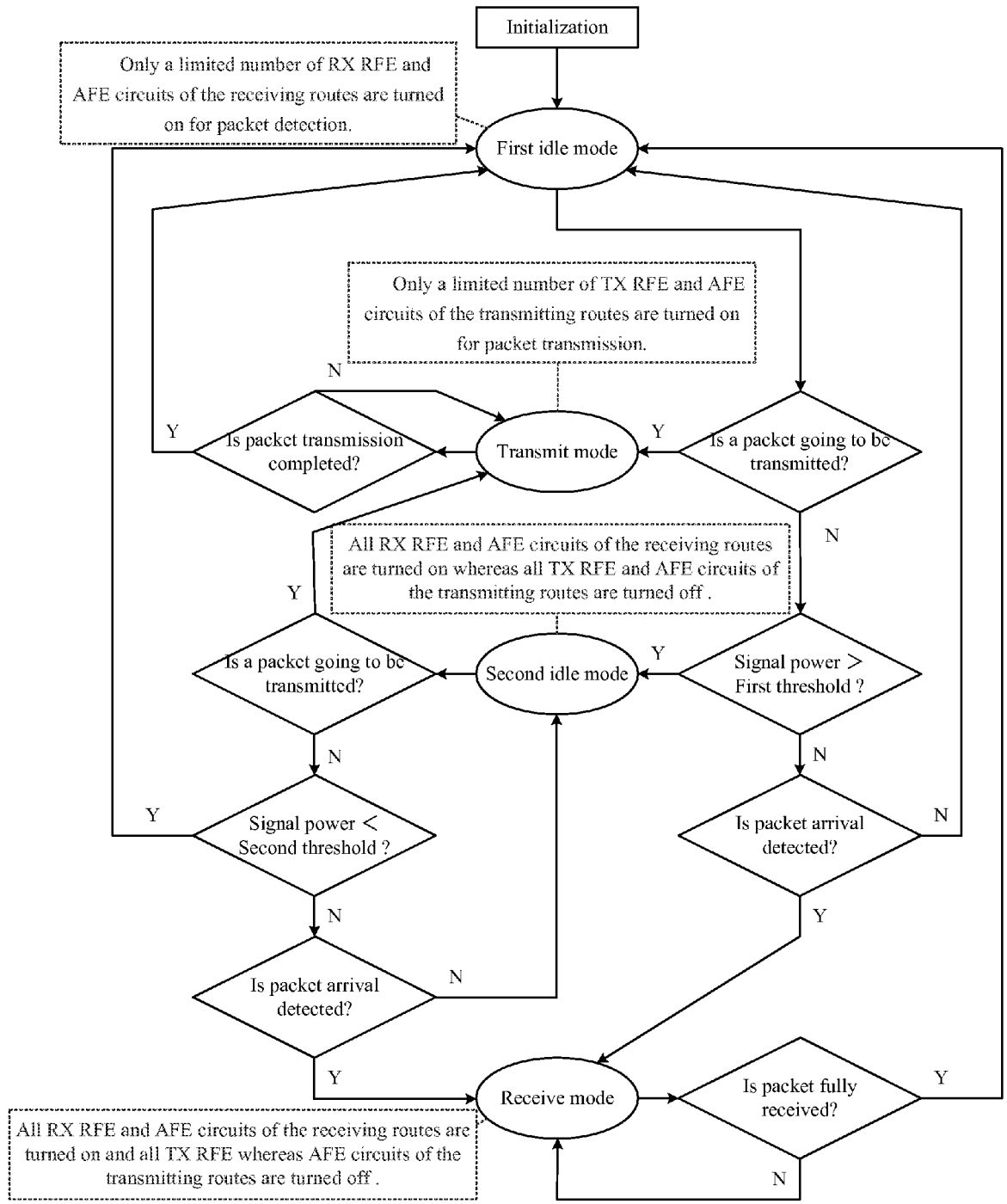
FIG. 12 illustrates a flow chart of the seventh method that applies to the preferred embodiment of the present invention.

In keeping with the features of the present invention, the seventh method that applies to the preferred embodiment of a multiple-antenna transceiver is depicted in a flow chart in FIG. 12. The steps are summarized as follows:

(1) Entering a first idle mode initially:

Only a certain number of RX RFE and AFE circuits of the receiving routes are turned on for power and packet detection of the incoming signal, the RX RFE and AFE circuits of the rest of the receiving routes and all TX RFE and AFE circuits of the transmitting routes are turned off accordingly.

(2) Entering transmit mode from the first idle mode when a packet is to be transmitted in the first idle mode:

Only certain TX RFE and AFE circuits of the transmitting routes are turned on to transmit the packet and the rest of the TX RFE and AFE circuits of the transmitting routes and all RX RFE and AFE circuits of the receiving routes are in the off state. When the packet transmission is completed, the state returns to the first idle mode.

(3) Entering a second idle mode from the first idle mode when the detected signal power exceeds a first threshold in the first idle mode:

All RX RFE and AFE circuits of the receiving routes are turned on to continue with signal power and packet detection while all TX RFE and AFE circuits of the transmitting routes remain in the off state.

(4) Entering receive mode from the first idle mode when packet arrival is detected in the first idle mode:

All RX RFE and AFE circuits of the receiving routes are turned on to receive the packet while all TX RFE and AFE circuits of the transmitting routes remain in the off state. When the packet is fully received, the state returns to the first idle mode.

(5) Entering the first idle mode from the second idle mode when the detected signal power is below a second threshold in the second idle mode:

Only a certain number of RX RFE and AFE circuits of the receiving routes are reserved for the ongoing power and packet detection of the incoming signal whereas the RX RFE and AFE circuits of the rest of the receiving routes and all TX RFE and AFE circuits of the transmitting routes remain in the off state.

(6) Entering transmit mode from the second idle mode when a packet is to be transmitted in the second idle mode:

Only certain TX RFE and AFE circuits of the transmitting routes are turned on to transmit the packet and the rest of the TX RFE and AFE circuits of the transmitting routes and all RX RFE and AFE circuits of the receiving routes are in the off state. When the packet transmission is completed, the state returns to the first idle mode.

(7) Entering receive mode from the second idle mode when packet arrival is detected in the second idle mode:

All RX RFE and AFE circuits of the receiving routes are turned on to receive the packet while all TX RFE and AFE circuits of the transmitting routes remain in the off state. When the packet is fully received, the state returns to the first idle mode.

There are in some cases of the foregoing steps that certain RX RFE and AFE circuits of the receiving routes are turned on just in order to meet the minimum requirement for the number of receiving routes. The RX RFE and AFE circuits of the rest of the receiving routes are thereby in the off state.

Figure 13:
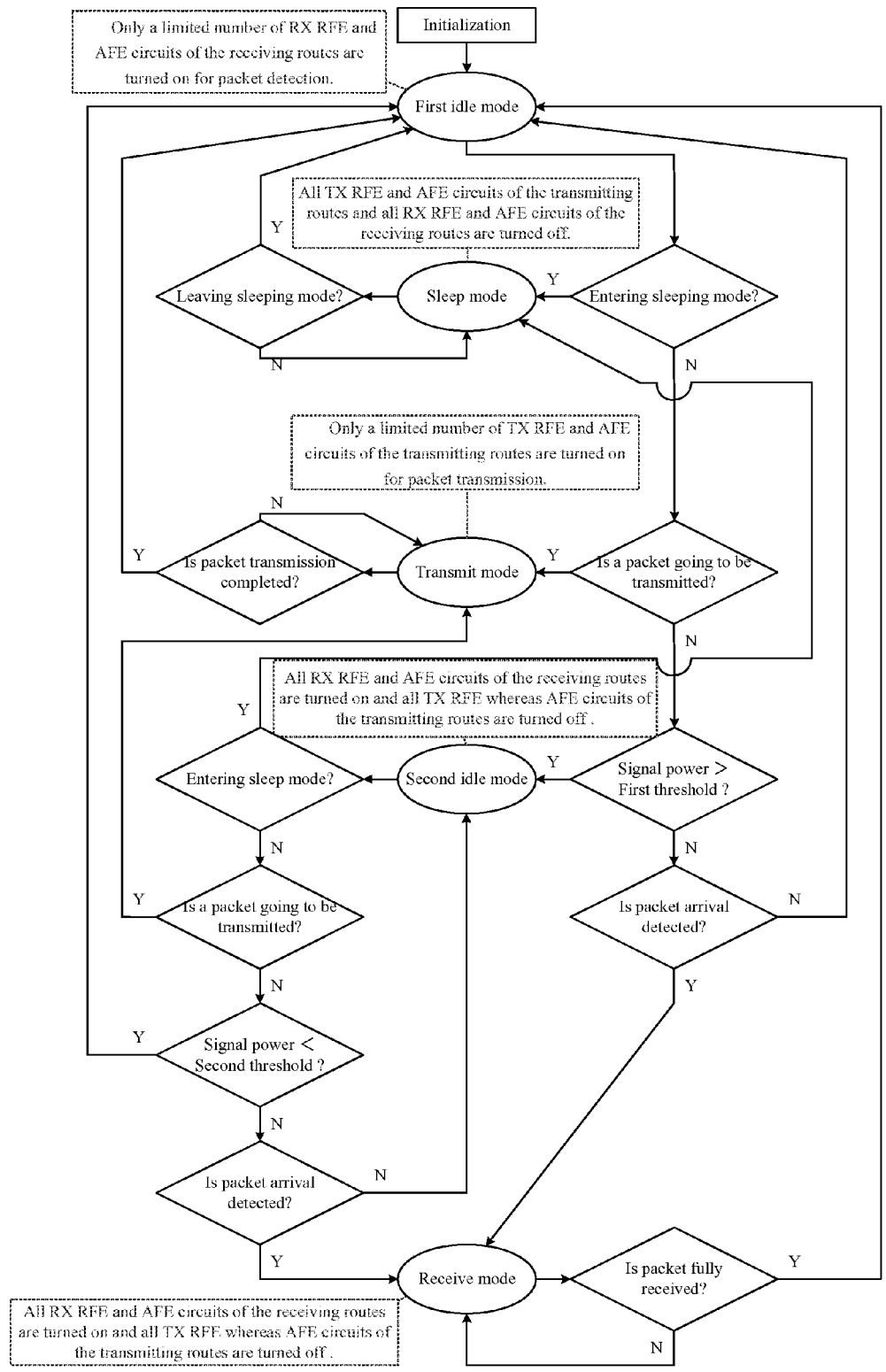
FIG. 13 illustrates a flow chart of the eighth method that applies to the preferred embodiment of the present invention.

In keeping with the features of the present invention, the eighth method that applies to the preferred embodiment of a multiple-antenna transceiver is depicted in a flow chart in FIG. 13. The steps are summarized as follows:

(1) Entering a first idle mode initially:

Only a certain number of RX RFE and AFE circuits of the receiving routes are turned on for power and packet detection of the incoming signal, the RX RFE and AFE circuits of the rest of the receiving routes and all TX RFE and AFE circuits of the transmitting routes are turned off accordingly.

(2) Entering sleep mode from the first idle mode when the sleep mode is activated:

All RX RFE and AFE circuits of the receiving routes, TX RFE and AFE circuits of the transmitting routes are turned off until the first idle mode is reentered upon request.

(3) Entering transmit mode from the first idle mode when a packet is to be transmitted in the first idle mode:

Only certain TX RFE and AFE circuits of the transmitting routes are turned on to transmit the packet and the rest of the TX RFE and AFE circuits of the transmitting routes and all RX RFE and AFE circuits of the receiving routes are in the off state. When the packet transmission is completed, the state returns to the first idle mode.

(4) Entering a second idle mode from the first idle mode when the detected signal power exceeds a first threshold in the first idle mode:

All RX RFE and AFE circuits of the receiving routes are turned on to continue with signal power and packet detection while all TX RFE and AFE circuits of the transmitting routes remain in the off state.

(5) Entering receive mode from the first idle mode when packet arrival is detected in the first idle mode:

All RX RFE and AFE circuits of the receiving routes are turned on to receive the packet while all TX RFE and AFE circuits of the transmitting routes remain in the off state. When the packet is fully received, the state returns to the first idle mode.

(6) Entering sleep mode from the second idle mode in the second idle mode:

All RX RFE and AFE circuits of the receiving routes and TX RFE and AFE circuits of the transmitting routes are turned off until the first idle mode is entered upon request.

(7) Entering the first idle mode from the second idle mode when the detected signal power is below a second threshold in the second idle mode:

Only a certain number of RX RFE and AFE circuits of the receiving routes are reserved for the ongoing power and packet detection of the incoming signal whereas the RX RFE and AFE circuits of the rest of the receiving routes and all TX RFE and AFE circuits of the transmitting routes remain in the off state.

(8) Entering transmit mode from the second idle mode when a packet is to be transmitted in the second idle mode:

Only certain TX RFE and AFE circuits of the transmitting routes are turned on to transmit the packet and the rest of the TX RFE and AFE circuits of the transmitting routes and all RX RFE and AFE circuits of the receiving routes are in the off state. When the packet transmission is completed, the state returns to the first idle mode.

(9) Entering receive mode from the second idle mode when packet arrival is detected in the second idle mode:

All RX RFE and AFE circuits of the receiving routes are turned on to receive the packet while all TX RFE and AFE circuits of the transmitting routes remain in the off state. When the packet is fully received, the state returns to the first idle mode.

There are in some cases of the foregoing steps that certain RX RFE and AFE circuits of the receiving routes are turned on just in order to meet the minimum requirement for the number of receiving routes. The RX RFE and AFE circuits of the rest of the receiving routes are thereby in the off state.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A multiple-antenna transmitter for transmitting a data frame, said data frame comprising a preamble sequence, a header sequence, and a data sequence, said transmitter comprising:
   a sequence selection circuit for selecting among said preamble sequence, header sequence and data sequence, and to output the sequences one at a time successively;
   a MIMO modulation and coding circuit for modulation and coding of the sequences outputted from said sequence selection circuit to generate a modulation and coding signal;
   a plurality of TX RFE and AFE circuits coupled to said MIMO modulation and coding circuit for transmitting said modulation and coding signal; and
   a controller, coupled to each of the plurality of TX RFE and AFE circuits, for enabling or disabling the plurality of TX RFE and AFE circuits individually according to a state of the multiple-antenna transmitter.

2. The multiple-antenna transmitter as claimed in claim 1 operates in a sleep mode, wherein said controller disables the plurality of TX RFE and AFE circuits during said sleep mode.

3. The multiple-antenna transmitter as claimed in claim 1 operates in a transmit mode, wherein said controller enables selected TX RFE and AFE circuits during said transmit mode and disables the non-selected TX RFE and AFE circuits.

4. The multiple-antenna transmitter as claimed in claim 1 is utilized in a wireless local area network (WLAN).

5. The multiple-antenna transmitter as claimed in claim 1 is utilized in a Worldwide Interoperability for Microwave Access (WiMAX).

6. The multiple-antenna transmitter as claimed in claim 1 is utilized in 4G mobile phone system.

7. A multiple-antenna receiver for receiving a data frame, said data frame comprising a preamble sequence, a header sequence, and a data sequence, said receiver comprising:
   N RX RFE and AFE circuits for generating N radio frequency receiving signals from radio frequency signals received from antennas;
   a MIMO demodulation and decoding circuit coupled to said N RX RFE and AFE circuits for demodulation and decoding said N radio frequency receiving signals to generate a demodulation and decoding signal;
   a sequence separation circuit coupled to said MIMO demodulation and decoding circuit for separating said demodulation and decoding signal to generate said header sequence and said data sequence of said data frame;
   a controller, coupled to each of said N RX RFE and AFE circuits, for enabling or disabling each of said N RX RFE and AFE circuits individually according to a state of the multiple-antenna receiver.

8. The multiple-antenna receiver as claimed in claim 7 operates in a sleep mode, wherein said controller disables each of said N RX RFE and AFE circuits during said sleep mode.

9. The multiple-antenna receiver as claimed in claim 7 operates in an idle mode, wherein said controller enables 1 RX RFE and AFE circuit and disables N-1 RX RFE and AFE circuits of said N RX RFE and AFE circuits during said idle mode.

10. The multiple-antenna receiver as claimed in claim 7 operates in a receive mode, wherein said controller enables said N RX RFE and AFE circuits during said receive mode.

11. The multiple-antenna receiver as claimed in claim 7 is utilized in a wireless local area network (WLAN).

12. The multiple-antenna receiver as claimed in claim 7 is utilized in a Worldwide Interoperability for Microwave Access (WiMAX).

13. The multiple-antenna receiver as claimed in claim 7 is utilized in 4G mobile phone system.

14. A method for operating a multiple-antenna receiver with a plurality of N receiving routes, said multiple-antenna receiver operates in an idle mode or a receive mode, said method comprising the steps of:
   respectively enabling a plurality of M receiving routes and respectively disabling the remaining N-M receiving routes of said multiple-antenna receiver during said idle mode, wherein $1 \leq M < N$; and respectively enabling a plurality of K receiving routes and respectively disabling the remaining N-K receiving routes of said multiple-antenna receiver during said receive mode, wherein 1≦M≦K<N.

15. The method as claimed in claim 14, wherein said multiple-antenna receiver further operates in a sleep mode, and said N receiving routes are disabled during said sleep mode.

16. The method as claimed in claim 14, wherein said multiple-antenna receiver is utilized in a wireless local area network (WLAN).

17. The method as claimed in claim 14, wherein said multiple-antenna receiver is utilized in a Worldwide Interoperability for Microwave Access (WiMAX).

18. The method as claimed in claim 14, wherein said multiple-antenna receiver is utilized in 4G mobile phone system.

19. The method as claimed in claim 14, wherein each of said N receiving routes comprises a RX RFE and AFE circuit.

* * * * *